Patented Apr. 27, 1926.

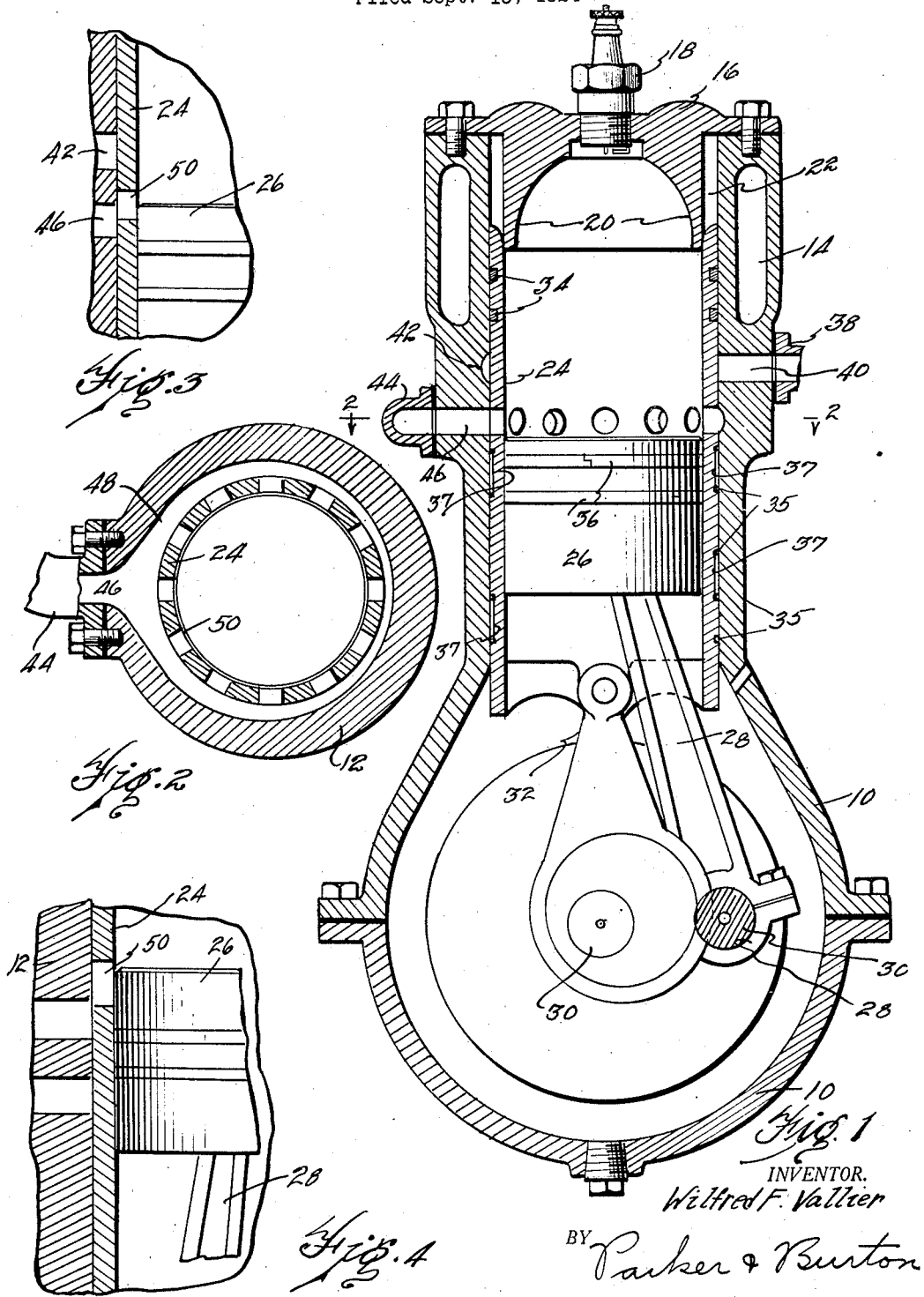

1,582,195

UNITED STATES PATENT OFFICE.

WILFRED F. VALLIER, OF PONTIAC, MICHIGAN.

INTERNAL-COMBUSTION ENGINE.

Application filed September 15, 1924. Serial No. 737,697.

*To all whom it may concern:*

Be it known that I, WILFRED F. VALLIER, a citizen of the United States, residing at Pontiac, county of Oakland, State of Michigan, have invented a certain new and useful Improvement in Internal-Combustion Engines, and declare the following to be a full, clear, and exact description of the same, such as will enable others skilled in the art to which it pertains to make and use the same, reference being had to the accompanying drawings, which forms a part of this specification.

My invention relates to an improved two cycle internal combustion engine having an intake and an exhaust communicating with the combustion chamber and controlled in co-ordination with the travel of the piston so that the intake is open to admit an explosive mixture to the combustion chamber at a point substantially intermediate the travel of the piston on its explosion stroke and for such a length of time that sufficient depression is created in the cylinder to draw the charge thereinto.

The construction might be described as one in which the upper part of the cylinder serves as a combustion chamber and the lower part as a suction chamber, said cylinder being in communication with the intake during the travel of the piston on its explosion stroke through such lower part of the cylinder whereby the explosive mixture is drawn into the combustion chamber from the intake. The fuel mixture is not forced under compression into the cylinder as is the general practice in two cycle engines but is drawn therein by suction in a manner somewhat similar to four cycle engine practice.

A meritorious feature is the provision of a cylinder having an intake and an exhaust communicating therewith at a point substantially intermediate the travel of the piston therein, and a working sleeve and a piston co-ordinated to travel within the sleeve to control the communication of the intake and exhaust with the cylinder.

A further important object is the provision in my improved structure of a cylinder having exhaust and intake ports controlled by a working piston and a sleeve, within which the piston travels, such piston and sleeve being co-ordinated as to movement so that said ports are opened successively in the order above enumerated on the explosion stroke of the piston, the intake port communicating with the cylinder during substantially the latter half of the explosion stroke of the piston.

The exhaust and intake ports terminate interior of the cylinder in annular grooves. These grooves are of less depth on the side opposite the port than on the side adjacent thereto.

The above objects and others together with further details of structure of the preferred form of my device illustrated in the accompanying drawing will appear in the following specification and the invention is further defined in the appended claims.

In the drawings,—

Figure 1 is a vertical sectional view through my improved engine.

Fig. 2 is a horizontal sectional view taken on line 2—2 of Fig. 1.

Figs. 3 and 4 are fragmentary sectional views showing the operation of the piston and sleeve with respect to the exhaust and intake ports controlled thereby.

In the drawings, let 10 indicate the crankcase 12 the cylinder provided with a suitable water jacket 14 and a removable cylinder head 16 which carries the spark plug 18. The cylinder head is domeshaped and extends downwardly as at 20 interiorly of the cylinder and spaced from the wall thereof to form an annular pocket 22.

A sleeve 24 is mounted in the cylinder and a piston 26 is mounted in the sleeve. A connecting rod 28 secures the piston to crankshaft 30 and a connecting rod 32 secures the sleeve to an eccentric carried by the crankshaft 30 so that the sleeve and piston are coordinated in travel. The travel of the piston is far greater than that of the sleeve; for example, if the piston has a stroke of seven inches, the stroke of the sleeve might well be one and one-quarter inches. The sleeve is provided with packing rings 34 and the piston with packing rings 36.

For lubrication purposes the sleeve is also provided with a plurality of vertically spaced apart circumferential oil grooves 35 communicating with each other by upright grooves 37. These grooves 37 are disposed on opposite sides of the sleeve between successive pairs of the grooves 35.

Suitable exhaust and intake manifolds communicate with the cylinder by means of exhaust and intake ports. A broken-away section of the exhaust manifold is indicated at 38 which communicates by means of an exhaust port 40 with the interior of the cylinder. This exhaust port terminates interiorly of the cylinder in an annular groove 42. The intake 44 communicates with the interior of the cylinder through an intake port 46 which also terminates interiorly of the cylinder in an annular groove here indicated as 48. These annular grooves 42 and 48 are cut to a less depth on the side of the cylinder opposite the port than on the side adjacent thereto and taper gradually from such intermediate point circumferentially the cylinder. This feature will appear in the cross-sectional view of Fig. 2.

The exhaust and intake ports are here shown on opposite sides of the cylinder from each other, but they might, if desired, be located on the same side.

The sleeve 24 is provided with a plurality of ports 50 adapted to register successively with the annular grooves 42 and 48 and thereby bring the interior of the cylinder into communication with the exhaust and intake ports.

On the downward travel of the piston upon its explosion stroke the ports 50 in the sleeve are first brought into registration with the groove 42 which opens into the exhaust port 40. This is shown in Fig. 4. The sleeve and piston are so co-ordinated in travel that as the openings 50 come into registration with the groove 42 the piston uncovers these openings 50 to permit the exhaust of the gases of combustion in the cylinder. When the openings 50 are completely in registration with the groove 42 the piston has descended sufficiently to completely uncover the openings 50. Further travel of the sleeve closes the exhaust port and opens the intake port 46. The piston has such a range of travel that after the intake port 46 is brought into communication with the cylinder the piston completes the explosion stroke and during the completion thereof and during the initial period of the return of the piston on the compression stroke the intake is in communication with the cylinder so that a charge of explosive gases may be drawn into the cylinder.

It will be seen that the exhaust and intake ports open into the cylinder at a point substantially intermediate the stroke of the piston. Following the opening of the intake port and during the time it remains open the piston travels through substantially the latter half of its explosion stroke. The travel of the piston, therefore, during the open period of the intake is sufficient to create such a depression in the cylinder as to draw a charge of explosive mixture therein. On the upward travel of the piston the piston closes the ports 50 before they uncover the exhaust port into the cylinder. The gases are compressed and the charge exploded in the ordinary fashion. The sleeve in its travel works within the pocket 22. The tapered character of the annular grooves in the cylinder facilitates the passage of the gases therethrough. It is obvious that during a short initial period of the compression stroke the intake is open.

The upper portion of the cylinder or that portion which serves as the combustion chamber proper is completely closed. It might be said that the lower portion of the cylinder as distinguished from the upper portion in which the explosion takes place constitutes the suction chamber for it is during the travel of the piston through such lower portion following the discharge of the gases of explosion, that the charge is drawn into the cylinder.

What I claim is:

1. In a two cycle internal combustion engine, a cylinder, a working sleeve in the cylinder, a working piston in the sleeve, an exhaust and an intake communicating with the cylinder at a point substantially intermediate the path of travel of the piston therein, the movement of the sleeve co-ordinated with the movement of the piston to successively bring the exhaust and intake into communication with the clyinder in the order named on the explosion stroke of the piston and at substantially the mid-point of travel of the piston, said intake adapted to remain open to the cylinder during such a period of piston travel on the explosion stroke as to draw a charge therethrough into the cylinder.

2. In a two cycle internal combustion engine, a cylinder, a working sleeve in the cylinder, a working piston in the sleeve, said cylinder provided at substantially the mid point of the path of travel of the piston with exhaust and intake ports, said sleeve provided with a port to register with said exhaust and intake ports, said sleeve and piston co-ordinated in movement so that the exhaust port in the cylinder is uncovered by the port in the sleeve and the port in the sleeve is uncovered by the piston at a point substantially intermediate the travel of the piston on the explosion stroke and the intake port of the cylinder is uncovered immediately thereafter by the port in the sleeve and remains open during the completion of the explosion stroke.

3. In a two cycle internal combustion engine, a cylinder, a working sleeve in the cylinder, a working piston in the sleeve, said cylinder provided at a point intermediate the path of travel of the piston with exhaust and intake ports, said sleeve provided with a port adapted to be brought into registration with said exhaust and intake ports, said sleeve and piston co-ordinated in movement so that the exhaust port in the cylinder is uncovered by the port in the sleeve and the port in the sleeve is uncovered by the piston at approximately the mid-point of travel of the piston on the explosion stroke and the intake port of the cylinder is uncovered immediately thereafter by the port in the sleeve and remains open during the completion of the explosion stroke, said piston adapted on the compression stroke to close the port in the sleeve before said port uncovers the exhaust opening into the cylinder.

4. In a two cycle internal combustion engine, a cylinder, a working piston therein, said cylinder provided with exhaust and intake ports through its wall adapted to be uncovered by the piston during its travel, said ports terminating interiorly of the cylinder in circumferential grooves of greater depth adjacent to the port than on the side of the cylinder opposite the port.

5. In a two cycle internal combustion engine, a cylinder, a working piston therein, said cylinder wall provided with an intake port on one side and an exhaust port on the opposite side, said ports being located at approximately the mid-point of the path of travel of the piston one above the other and each port terminating interiorly of the cylinder in the annular groove of less depth on the side opposite port than adjacent thereto.

6. In an internal combustion engine, a cylinder having an exhaust port and an intake port, a channel extending from each port interiorly about the cylinder of gradually decreasing depth from the port to the opposite side of the cylinder, a working sleeve within the cylinder, a working piston within the sleeve, said sleeve provided with an annular succession of wall openings adapted to be brought into registration with the port channels of the cylinder.

In testimony whereof, I sign this specification.

WILFRED F. VALLIER.